United States Patent
Yi (10) Patent No.: US 9,176,289 B2
(45) Date of Patent: Nov. 3, 2015

(54) PLUGGABLE DATA COMMUNICATION MODULE WITH COMPLIANT PUSH-PULL TAB

(71) Applicant: Avago Technologies General IP (Singapore) Pte. Ltd., Singapore (SG)

(72) Inventor: Robert Yi, San Jose, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 202 days.

(21) Appl. No.: 13/718,625

(22) Filed: Dec. 18, 2012

(65) Prior Publication Data

US 2014/0168906 A1    Jun. 19, 2014

(51) Int. Cl.
  *H05K 5/02* (2006.01)
  *G02B 6/42* (2006.01)

(52) U.S. Cl.
  CPC ............ *G02B 6/4278* (2013.01); *G02B 6/4284* (2013.01); *H05K 5/02* (2013.01)

(58) Field of Classification Search
  CPC .................................. H05K 5/023; H05K 5/02

USPC .................. 361/728, 747; 312/332.1; 385/53; 403/116

See application file for complete search history.

(56) References Cited

U.S. PATENT DOCUMENTS

| | | | | |
|---|---|---|---|---|
| 3,926,314 | A * | 12/1975 | Dogliotti | 211/85.17 |
| 4,812,932 | A * | 3/1989 | Hishinuma et al. | 360/97.19 |
| 6,430,053 | B1 * | 8/2002 | Peterson et al. | 361/728 |
| 6,746,158 | B2 | 6/2004 | Merrick | |
| 6,771,511 | B2 * | 8/2004 | Bui | 361/728 |
| 6,851,867 | B2 | 2/2005 | Pang et al. | |
| 7,040,911 | B1 | 5/2006 | Ho et al. | |
| 2003/0142917 | A1 * | 7/2003 | Merrick | 385/53 |
| 2011/0080008 | A1 | 4/2011 | Teo et al. | |
| 2012/0027362 | A1 | 2/2012 | Yi | |
| 2013/0115800 | A1 * | 5/2013 | Chan | 439/372 |

* cited by examiner

*Primary Examiner* — Dion R Ferguson
*Assistant Examiner* — Mandeep Buttar (57) ABSTRACT

A data communication module tab is sufficiently compliant in off-axis directions that it resists damage from forces in such off-axis directions, yet is sufficiently rigid in the direction of its longitudinal axis that a person can insert the data communication module into a cage and withdraw it from a cage by pushing and pulling the tab, respectively.

19 Claims, 8 Drawing Sheets

PLUGGABLE DATA COMMUNICATION MODULE WITH COMPLIANT PUSH-PULL TAB

BACKGROUND

In data communication systems, it is often useful to modularize interface electronics and other interface elements in a data communication module. For example, in an optical data communication system, an opto-electronic transceiver module may include a light source such as a laser, and a light detector such as a photodiode, and may also include driver and receiver circuitry associated with the laser and photodiode. To use such an opto-electronic transceiver module, an optical fiber cable is plugged into a port in the module. Such a module also includes electrical contacts that can be coupled to an external electronic system.

Another example of a data communication module is an Ethernet transceiver module. To use an Ethernet transceiver module, an Ethernet cable, which may have an electrical rather than an optical connector, is plugged into a port in the module. The module may include signal conditioning electronics. Such a module also includes electrical contacts that can be coupled to an external electronic system.

Some data communication modules are configured to be plugged into a cage or other receptacle. A standard data communication module configuration commonly referred to in the art as Small Form Factor Pluggable (SFP) includes an elongated housing having a generally rectangular profile. An SFP module is pluggable into a bay in the front panel of a cage having an array of such bays. The nose end of the module includes a mechanism that latches the module in the cage. The mechanism typically comprises a pin on the module housing and a catch on the cage. As a user pushes or inserts the module into the cage, the pin engages an opening in the catch to latch the module in place in the cage. To release or unlatch the module from the cage, the user flips a pivoting bail on the module or otherwise moves a mechanism on the module to cause the pin and the catch to disengage from each other. As the bail or other user-operated mechanism is more directly involved in de-latching the module from the cage rather than latching the module in the cage, the mechanism as a whole is typically referred to as a "de-latch mechanism."

In some modules, the bail can be used as a handle to extract the module from the cage after the module has been de-latched. However, in an instance in which many modules are plugged into the cage, forming a dense array, it may be difficult to grip the bail or otherwise grip a portion of the module to extract it from the cage. To address this potential problem, a module can be provided with an elongated handle or tab that extends from the nose end of the module. A user can readily grip the tab to more easily extract the module from the cage.

It has been suggested to provide a tab that a user not only can pull to extract the module from the cage but also push to insert the module into the cage. Providing such a push-pull tab poses challenges. A tab of the above-described elongated type that a user can pull (in the direction of an axis) to extract the module is commonly made of a flexible or compliant plastic that deflects or flexes in response to forces applied in directions other than along the axis. For example, the tab flexes if a downward or upward force is applied to the tab, as might occur if, for example, the person's hand or arm were inadvertently to brush against the tab while the person was attempting to reach for the tab of another module. It is believed important that the tab be flexible for several reasons. First, a rigid tab would be susceptible to breakage or similar damage from such off-axis forces. Similarly, a rigid tab would need to be strong enough to resist breakage or similar damage if a person were to attempt to hold the module only by its tab, demanding that the tab support the entire weight of the module. Second, a rigid tab could transmit such off-axis forces in a way that could inadvertently dislodge the module from the cage. Third, a rigid tab could transmit such off-axis forces to the cage in a way that could damage the cage.

SUMMARY

Embodiments of the present invention relate to a data communication module that includes a tab that is sufficiently compliant in off-axis directions that it resists damage from forces in such off-axis directions, yet is sufficiently rigid in the direction of the module longitudinal axis that a person can insert the module into a cage and withdraw it from a cage by pushing and pulling the tab, respectively.

In an exemplary embodiment, the data communication module includes module electronics configured to process data communication signals, a module housing, and an elongated tab having an end pivotally mounted to the first end of the module housing. The module housing has an elongated rectangular shape elongated in a direction of a longitudinal axis between a first end and a second end. The first end of the module housing has a module port for receiving a signal cable. The second end of the module housing has electrical contacts. The module electronics provide a processing path for the data communication signals between the module port and the electrical contacts. The elongated tab has a tab détente element engageable with a housing détente element of the module housing. The tab détente element is engageable with the housing détente element to hold the elongated tab in an orientation parallel to the longitudinal axis of the module housing and disengageable in response to an off-axis force. The détente engagement thus permits the elongated tab to pivot away from the orientation parallel to the longitudinal axis of the module housing in response to an off-axis force.

In another exemplary embodiment, the data communication module includes module electronics configured to process data communication signals, a module housing, and an elongated tab having at least a first section and a second section adjacent to the first section along the first axis. The module housing has an elongated rectangular shape elongated in a direction of a first axis between a first end and a second end. The first end of the module housing has a module port for receiving a signal cable. The second end of the module housing has electrical contacts. The module electronics provide a processing path for the data communication signals between the module port and the electrical contacts. The first section has a first section first end fixedly attached to the first end of the module housing at an attachment region. The first section of the elongated tab has a first section second end displaced from the attachment region along a second axis perpendicular to the first axis. The second section of the elongated tab has a second section first end fixedly connected to the first section second end at a resiliently flexible hinge between the first section and the second section. The second section has a second section second end displaced from the resiliently flexible hinge along the second axis. The resiliently flexible hinge defines an acute angle between a portion of the first section and an portion of the second section.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
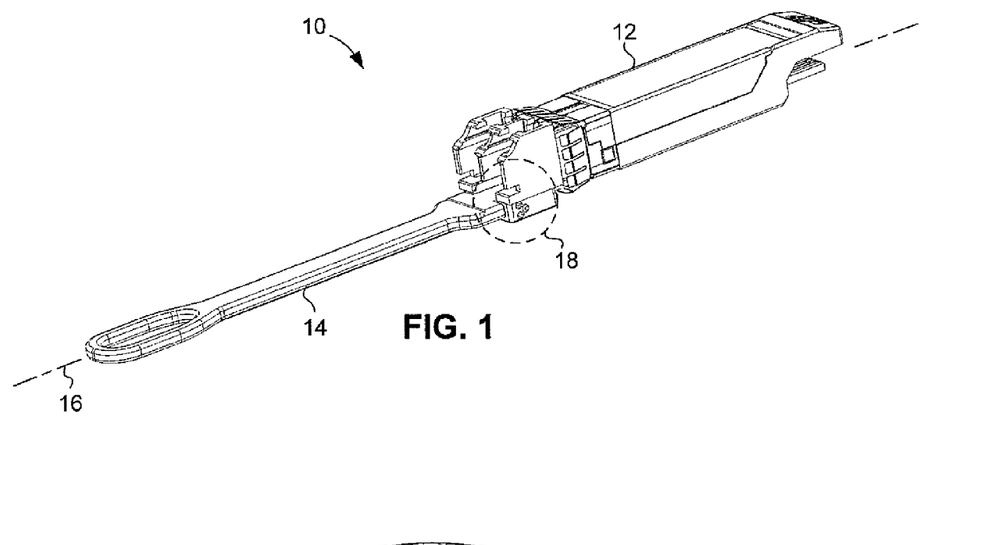
FIG. 1 is a perspective view of a data communication module, in accordance with an exemplary embodiment of the invention.

As illustrated in FIG. 1, in an illustrative or exemplary embodiment of the invention a data communication module 10 includes a housing 12 and a tab 14 attached to a first end of housing 12. Housing 12 is of a family of housing configurations commonly known as Small Form Factor Pluggable (SFP), which is characterized in part by an elongated shape and a generally rectangular profile. As well understood by persons of skill in the art, the second end of such an SFP module can be plugged into a cage (not shown) associated with an external electronic system, such as a switching system or processing system. Housing 12 is elongated in the direction of its longitudinal axis 16 between its first and second ends.

Figure 2:
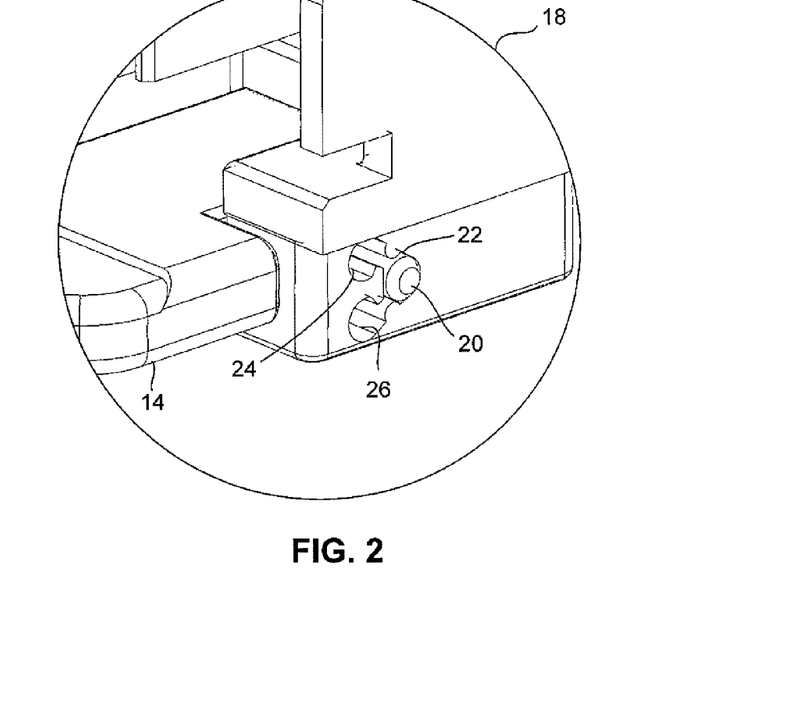
FIG. 2 is an enlargement of a portion of FIG. 1.
Figure 3:
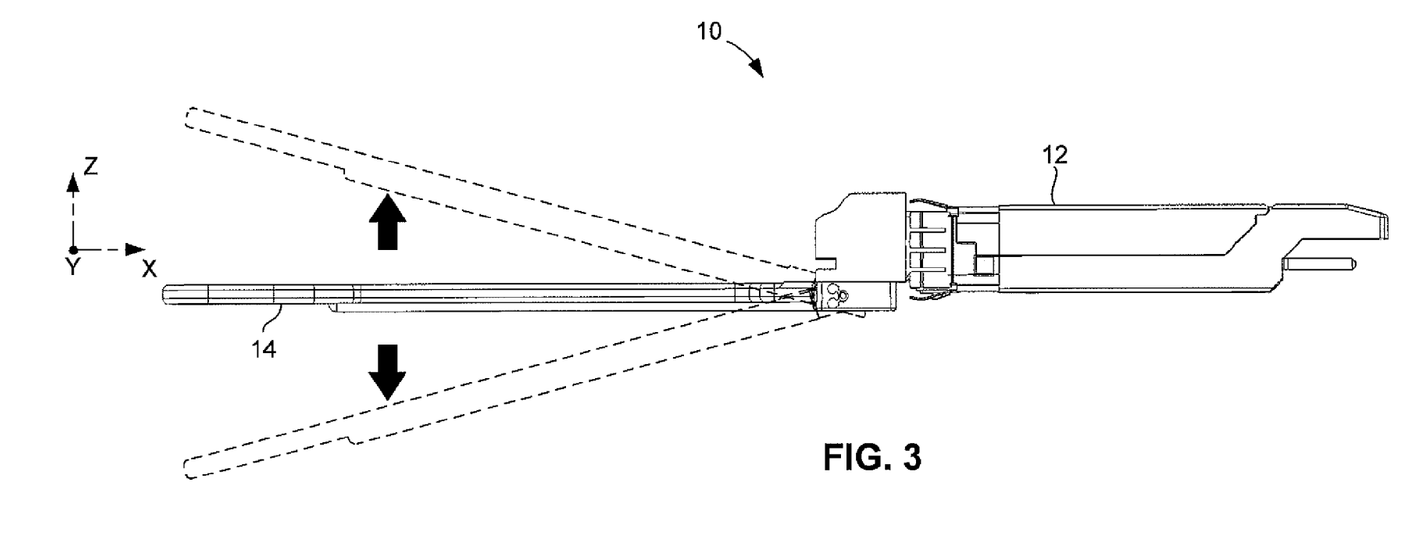
FIG. 3 is a side elevation view, showing the pivoting action of the tab of the data communication module of FIG. 1.

An enlargement 18 of a portion of FIG. 1 is shown in FIG. 2. As more clearly shown in FIG. 2, a pin 20 extends through one of three bores 22, 24 and 26 in the first end of housing 12. Pin 20 also extends through tab 14 and allows tab 14 to move relative to housing 12. A détente mechanism, described below, holds tab 14 in the orientation shown in solid line in FIG. 3. In this orientation, tab 14 is parallel to longitudinal axis 16 (FIG. 1). In response to forces in directions (indicated by arrows in FIG. 3) oblique to longitudinal axis 16 (referred to herein for convenience as "off-axis" directions), the détente mechanism releases its hold on tab 14 to allow tab 14 to pivot to positions such as those shown in broken line in FIG. 3. Longitudinal axis 16 can be referred to as the X axis in a reference or coordinate system having mutually perpendicular X, Y and Z axes.

Figure 4:
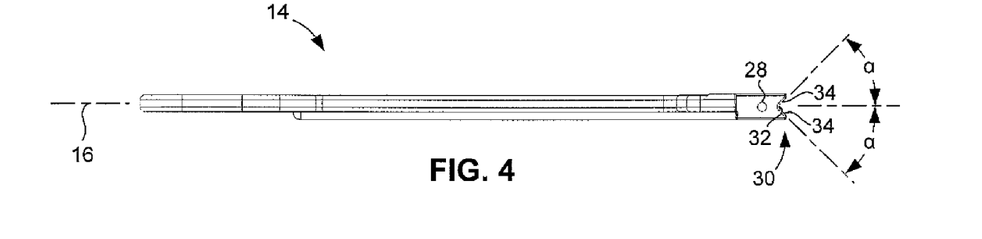
FIG. 4 is a side elevation view of the tab of the data communication module of FIG. 1.
Figure 5:
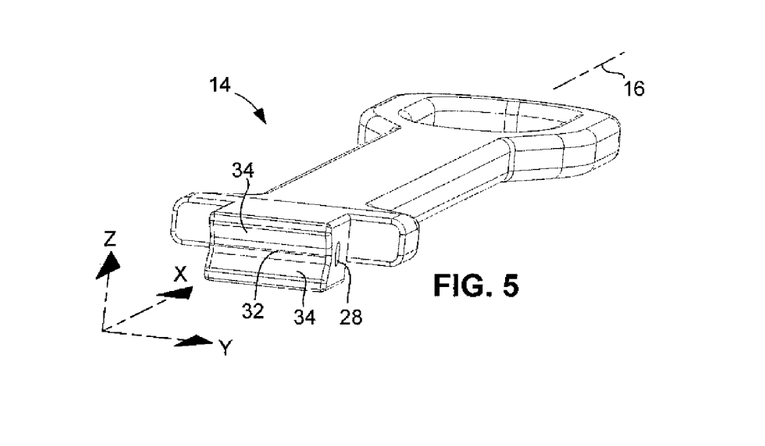
FIG. 5 is a top perspective view of the tab of the data communication module of FIG. 1.
Figure 6:
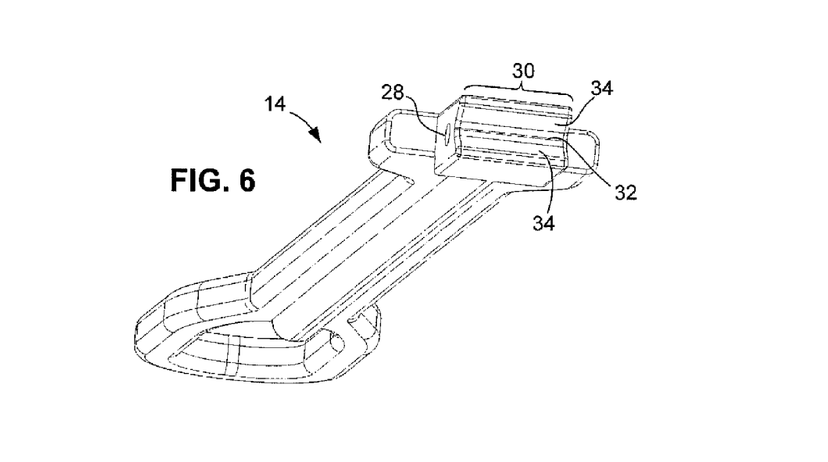
FIG. 6 is a bottom perspective view of the tab of the data communication module of FIG. 1.

As illustrated in FIGS. 4-6, a first end of tab 14 has a bore 28 through which pin 20 (FIG. 2) extends. The first end of tab 14 also includes a trough-shaped tab détente element 30. Tab détente element 30 has a trough 32 and walls 34 that extend in the Y-axis direction. Walls 34 extend away from the bottom of trough 32 at an oblique angle α (FIG. 4) to the X axis.

Figure 7:
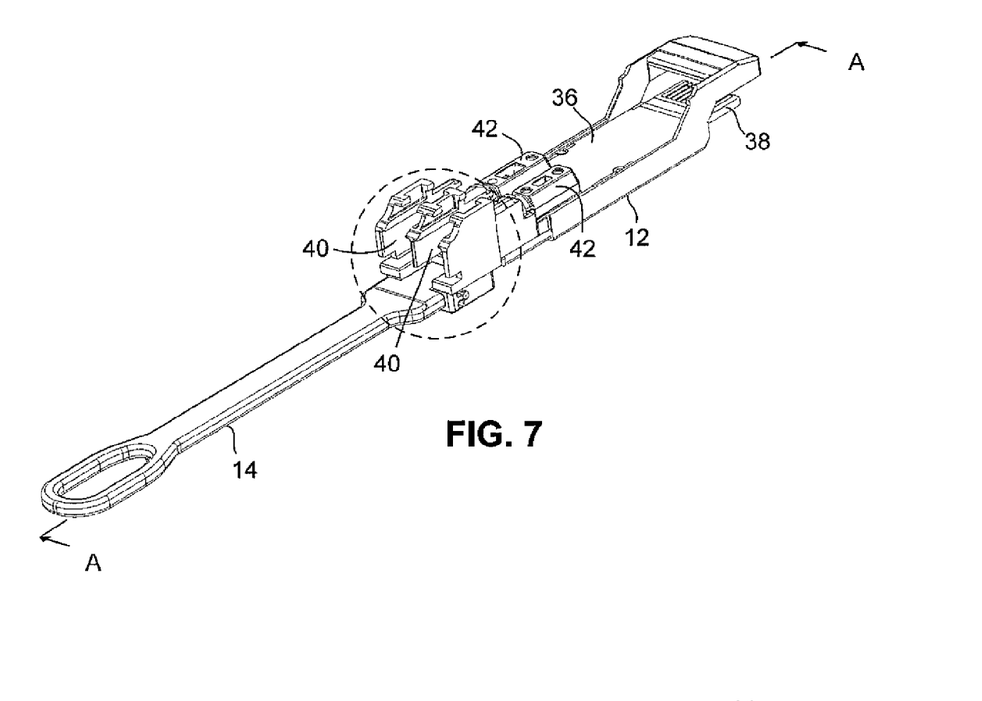
FIG. 7 is a top perspective view of the data communication module of FIG. 1, with a portion of the cover removed to reveal the interior.

As illustrated in FIG. 7, a printed circuit board 36 within housing 12 provides a signal processing path between electrical contact pads 38 on printed circuit board 36 and optical ports 40. As well understood by persons of skill in the art, fiber-optic cables (not shown) can be plugged into optical ports 40 at the first end of housing 12. Opto-electronic modules 42 mounted on printed circuit board 36 and containing opto-electronic conversion devices and optical elements convert electrical signals to optical signals and optical signals to electrical signals. Data communication module 10 communicates the optical signals via optical ports 40 and communicates the electrical signals via electrical contact pads 38.

Figure 8:
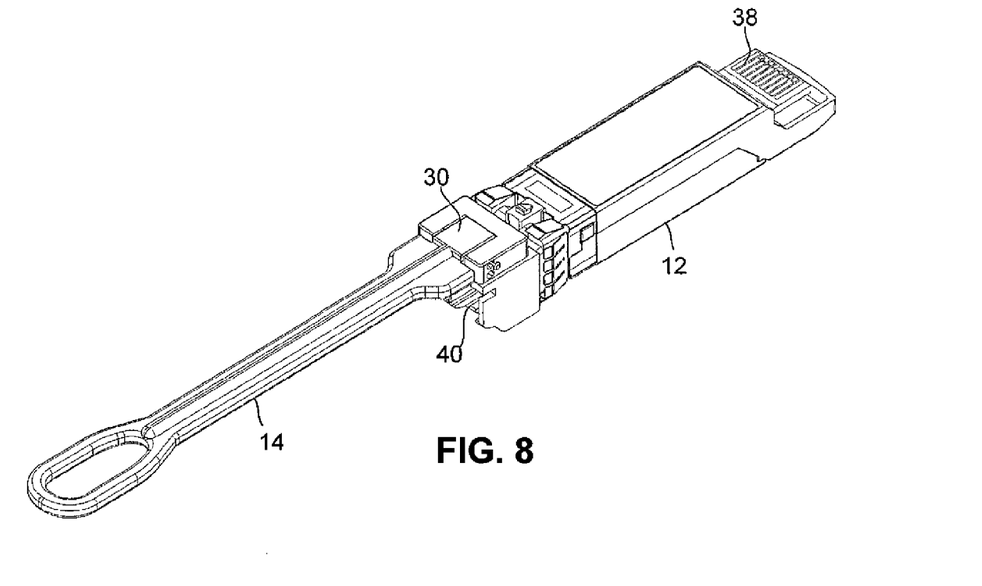
FIG. 8 is a bottom perspective view of the data communication module of FIG. 1
Figure 9:
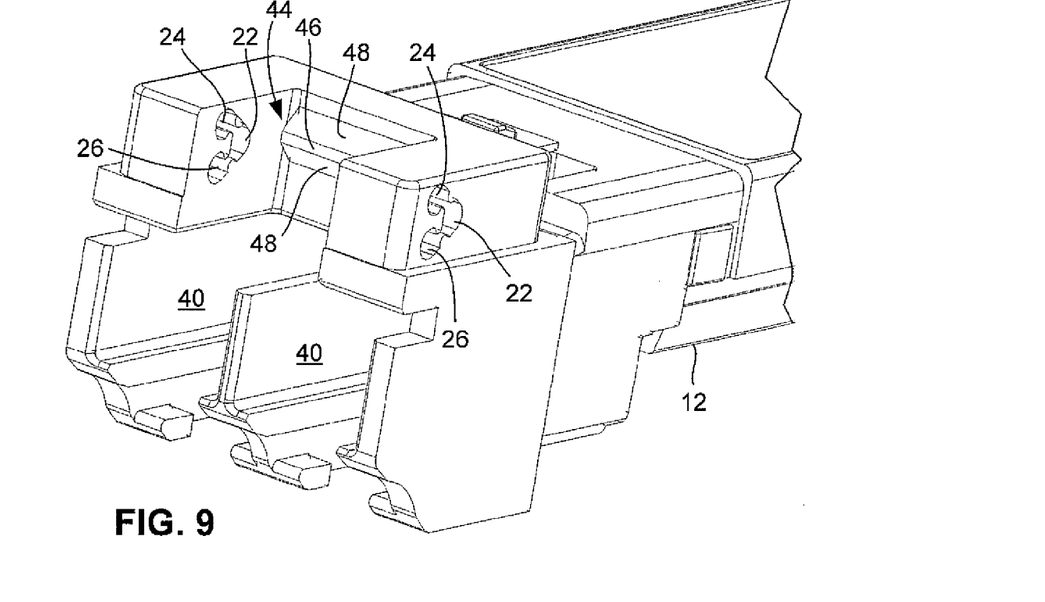
FIG. 9 is a bottom perspective view of the forward portion of the data communication module of FIG. 1.
Figure 10:
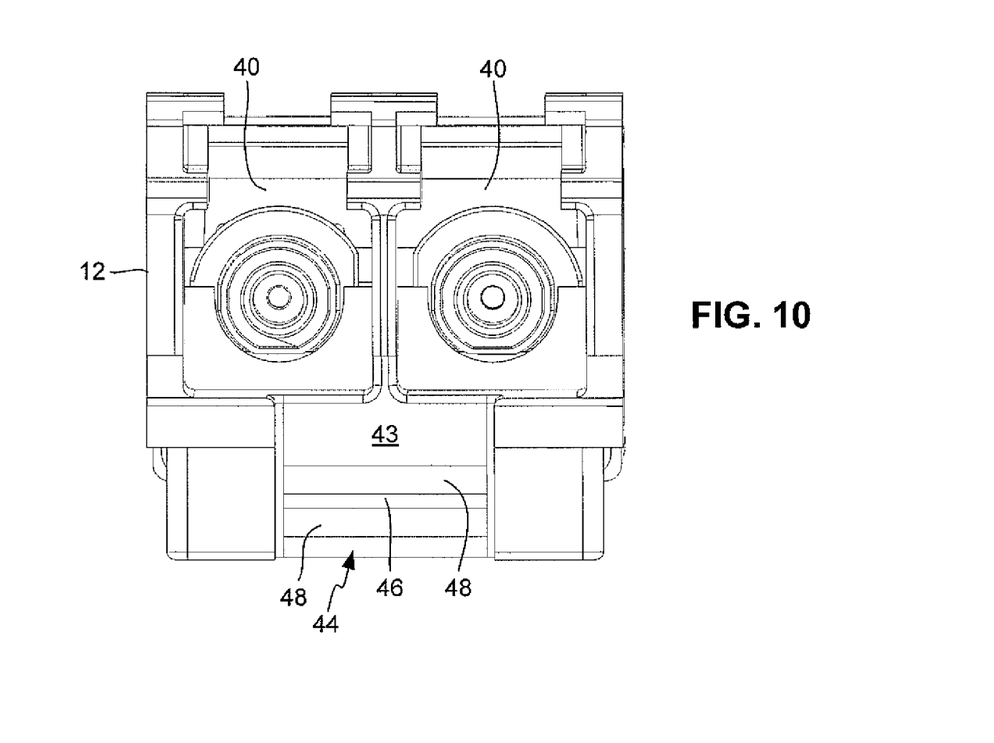
FIG. 10 is an end elevation view of the forward portion of the data communication module of FIG. 1.

Tab détente element 30 (FIG. 8) of tab 14 fits within a recess 43 (FIG. 10) in the first end of housing 12. As illustrated in FIGS. 9-10, a ridge-shaped housing détente element 44 protrudes from a wall of housing 12 within recess 43. Housing détente element 44 has a shape substantially complementary to the shape of tab détente element 30. Accordingly, housing détente element 44 has a ridge 46 flanked by walls 48 extending away from ridge 46 at the same oblique angle (not indicated in FIGS. 9-10) as the above described angle α (FIG. 4).

Figure 11:
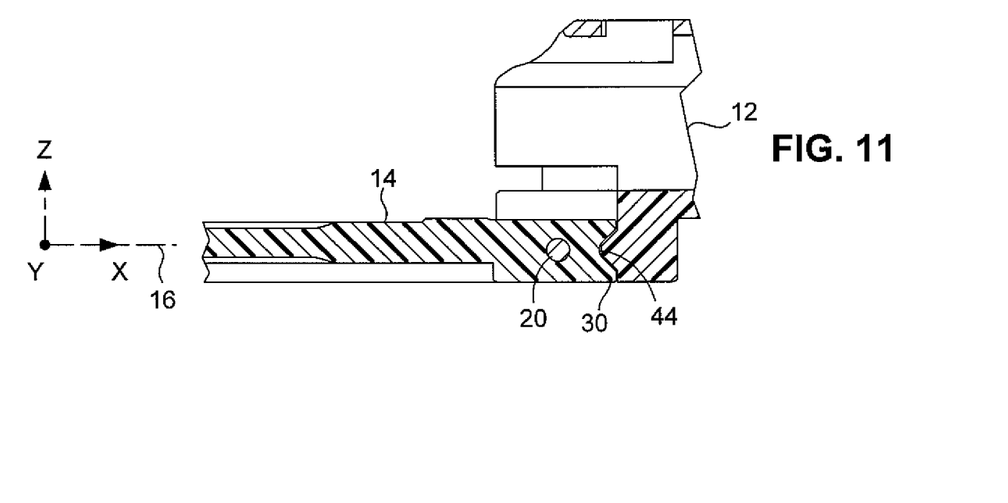
FIG. 11 is a partial sectional view of a region of FIG. 7 taken on line A-A of FIG. 7, showing the tab held in a horizontal orientation by the détente mechanism.

Tab détente element 30 defines a cam follower, and housing détente element 44 defines a cam. When tab détente element 30 is seated within housing détente element 44, ridge 46 of housing détente element 44 is seated within trough 32 of tab détente element 30, and walls 48 of housing détente element 44 contact walls 34 of tab détente element 30. As illustrated in FIG. 11, when tab détente element 30 is seated within (i.e., engages) housing détente element 44, this détente engagement holds tab 14 in an orientation parallel to longitudinal axis 16. In an instance in which a force (indicated by the arrow in FIG. 12) that is substantially in a negative Z-axis direction is exerted upon tab 14, the détente engagement disengages (from the engaged state shown in FIG. 11) in response to such a force. Such disengagement occurs because ridge 46 (FIGS. 9-10) of housing détente element 44 is displaced within trough 32 and slides against or engages in a camming manner one of the two walls 34 of tab détente element 30. This camming action unseats or disengages tab détente element 30 from housing détente element 44, allowing tab 14 to pivot downwardly (i.e., pivot about an axis corresponding to the Y axis, with the majority of tab 14 displaced substantially in a negative Z-axis direction). To return tab 14 to the state shown in FIG. 11, a person grasps tab 14 and pivots it upwardly (i.e., exerts a force substantially in the positive Z-axis direction), thereby causing housing détente element 44 and tab détente element 30 to re-engage each other.

Figure 12:
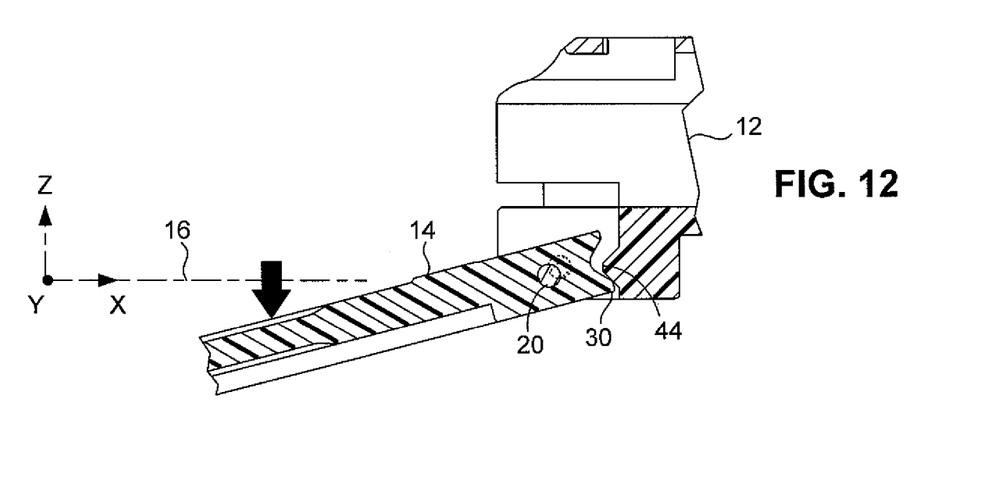
FIG. 12 is a partial sectional view of a region of FIG. 7 taken on line A-A of FIG. 7, showing the tab released by the détente mechanism and pivoting downwardly.

Note in FIG. 12 that when tab 14 pivots upwardly out of the détente engagement, pin 20 is displaced slightly out of bore 22 (FIG. 2) in a direction toward bore 26 (FIG. 2). Bore 22 is connected to bores 24 and 26 by small channels or slots that allow pin 20, which has a diameter larger than the slots. As the material from which the portion of housing 12 in which bores 22-26 are formed is made of a material that is slightly deformable, such as a semi-rigid plastic, the slots deform slightly to accommodate the displacement of pin 20 as a result of the camming action.

Figure 13:
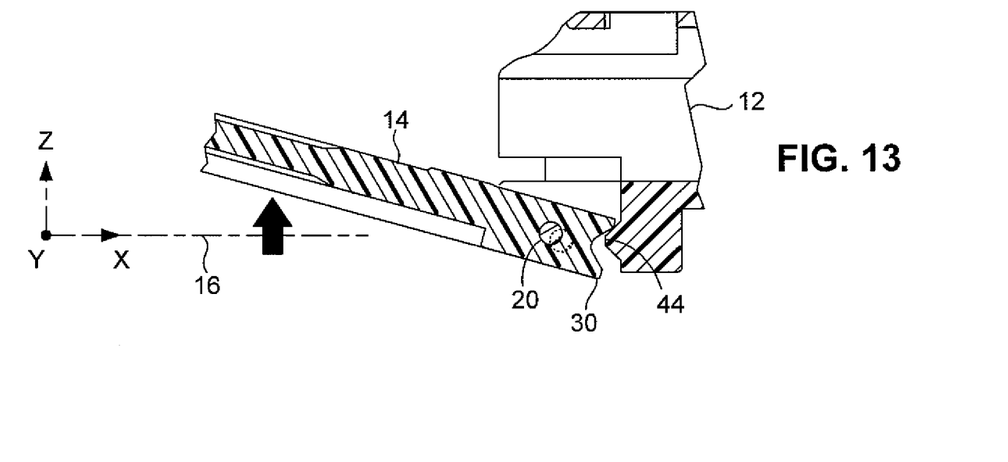
FIG. 13 is a partial sectional view of a region of FIG. 7 taken on line A-A of FIG. 7, showing the tab released by the détente mechanism and pivoting upwardly.

Likewise, in an instance in which a force (indicated by the arrow in FIG. 13) that is substantially in a positive Z-axis direction is exerted upon tab 14, the détente engagement disengages (from the engaged state shown in FIG. 11) in response to such a force. Such disengagement occurs because ridge 46 (FIGS. 9-10) of housing détente element 44 is displaced within trough 32 and slides against or engages in a camming manner the other one of the two walls 34 of tab détente element 30. This camming action likewise unseats or disengages tab détente element 30 from housing détente element 44, allowing tab 14 to pivot upwardly (i.e., pivot about an axis corresponding to the Y axis, with the majority of tab 14 displaced substantially in a positive Z-axis direction). To return tab 14 to the state shown in FIG. 11, a person grasps tab 14 and pivots it downwardly (i.e., exerts a force substantially in the negative Z-axis direction), thereby causing housing détente element 44 and tab détente element 30 to re-engage each other.

A person can use tab 14 to insert data communication module 10 into a cage (not shown) and withdraw data communication module 10 from a cage. Specifically, a person can grasp tab 14 and exert a "pulling" force, i.e., in a direction of the negative X axis, until data communication module 10 is withdrawn from the cage. Such a pulling force does not cause the above-described détente engagement to disengage. Similarly, a person can grasp tab 14 and exert a "pushing" force, i.e., in a direction of the negative X axis, until data communication module 10 is seated within the cage. Such a pushing force does not cause the above-described détente engagement to disengage.

Figure 14:
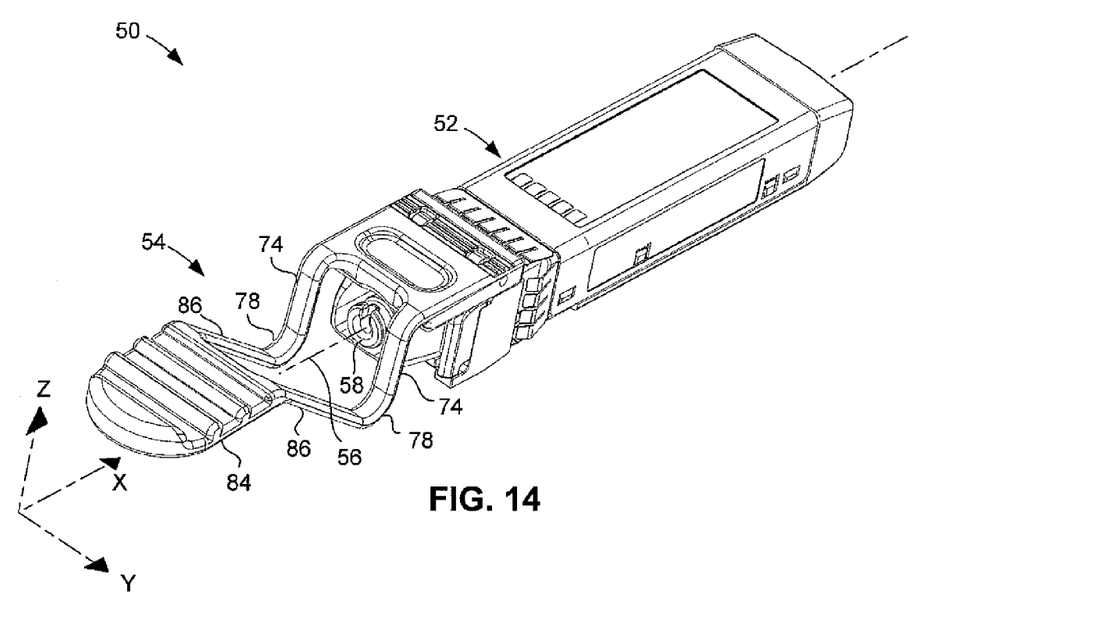
FIG. 14 is a perspective view of another data communication module, in accordance with another exemplary embodiment of the invention.
Figure 15:
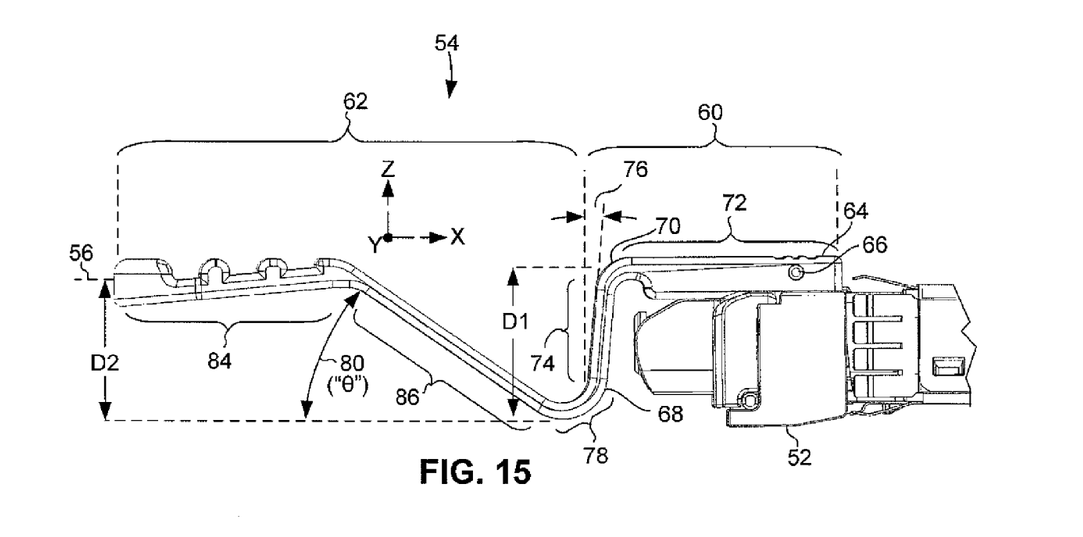
FIG. 15 is a side elevation view of the forward portion of the data communication module of FIG. 14.

As illustrated in FIGS. 14-15, in another illustrative or exemplary embodiment of the invention a data communication module 50 includes a housing 52 and a tab 54 attached to a first end of housing 52. Tab 54 is elongated in a direction corresponding to a longitudinal axis 56 of data communication module 50. Housing 52 is similar to housing 12 in the embodiment described above with regard to FIGS. 1-13. Also, the electronic and opto-electronic elements within housing 52 are similar to those described above with regard to the former embodiment. Accordingly, such elements provide a signal processing path between electrical contact pads (not shown) at a second end of housing 52 and an optical port 58 at first end of housing 52. Data communication module 52 converts optical signals to electrical signals and vice versa and otherwise operates with respect to the communication of such signals in a manner similar to that described above with regard to the former embodiment.

As illustrated in FIG. 15, tab 54 includes a first section 60 and a second section 62. First section 60 and second section 62 are adjacent to each other in the sense that they occupy adjacent regions along longitudinal axis 56. Note that longitudinal axis 56 is oriented in the direction of an X axis of a coordinate system having mutually perpendicular X, Y and Z axes. A first end 64 of first section 60 is attached via a pin 66 to a region at the first end of housing 52. First section 60 has a substantially planar or tab shape. A second end 68 of first section 60 is displaced ("D1") from first end 64 in the Z-axis direction. Thus, there is a first bend 70 between first end 64 and second end 68 of first section 60. It can further be noted that first section 60 includes a first portion 72 and a second portion 74. First portion 72 of first section 60 has a substantially planar or tab shape and is oriented substantially parallel to the X axis between the attachment region at pin 66 and a mid-region at first bend 70. Second portion 74 of first section 60 is oriented at an angle 76 between approximately 0 and 30 degrees between this mid-region and second end 68 of first section 60. That is, in the exemplary embodiment, the mid-region is characterized by a first bend 70 having an angle of between approximately 0 and 30 degrees.

Second section 62 joins first section 60 at second end 68 of first section 60. The juncture between first section 60 and second section 62 comprises a resiliently flexible hinge 78. Tab 54 can be made of a single piece of molded plastic, into which resiliently flexible hinge 78 is molded.

Second section 62 includes a first portion 84 having a substantially planar or tab shape (in the X-Y plane) and oriented substantially parallel to the X axis, and a second portion 86. First portion 84 of second section 62 serves as a handle for inserting and withdrawing data communication module 50 in a manner described below. Second portion 86 connects first portion 84 and resiliently flexible hinge 78. The displacement ("D2") of first portion 84 in the Z-axis direction from resiliently flexible hinge 78 is approximately equal to the displacement D1. Stated another way, first portion 84 of second section 62 is substantially coplanar with first portion 72 of first section 60.

Second portion 86 of second section 62 is oriented at an acute angle 80 (θ) with respect to the X axis. That is, the bend of resiliently flexible hinge 78 defines an acute angle 80 (θ). For reasons discussed below, second portion 86 of second section 62 is much more flexible than second portion 74 of first section 60. That is, the spring constant k2 of second portion 86 is much greater than the spring constant k1 of second portion 74. As well understood in the art, a spring constant of an elongated member is determined primarily by the length of the member and its thickness. Preferably, for an angle 80 (θ) that is between about 5 degrees and 30 degrees, k2 can be between about 1.5 times k2 and 10 times k2. Also, for an angle 80 (θ) that is between about 5 degrees and 30 degrees, second portion 86 of second section 62 is preferably between about 1.5 times and three times longer than second portion 74 of first section 60. The ratio of the lengths of second portion 86 and second portion 74 in combination with angle 80 is important because it promotes the push-pull tab function described below.

Referring again to FIG. 14, second portion 74 of first section 60 comprises two elongated parallel members spaced apart from each other in a Y-axis direction. Note that resiliently flexible hinge 78 comprises two hinge portions, each corresponding to one of the two elongated parallel members. Also note that second portion 86 of second section 62 similarly comprises two elongated parallel members spaced apart from each other in a Y-axis direction. Although not shown for purposes of clarity, the spaced parallel members define an opening through which an optical fiber cable can extend. Note that angle 80 (θ) and the ratio of the lengths of second portion 86 and second portion 74 are important to whether such an optical fiber cable can extend through the above-referenced opening without impairing the push-pull tab function described below.

Figure 16:
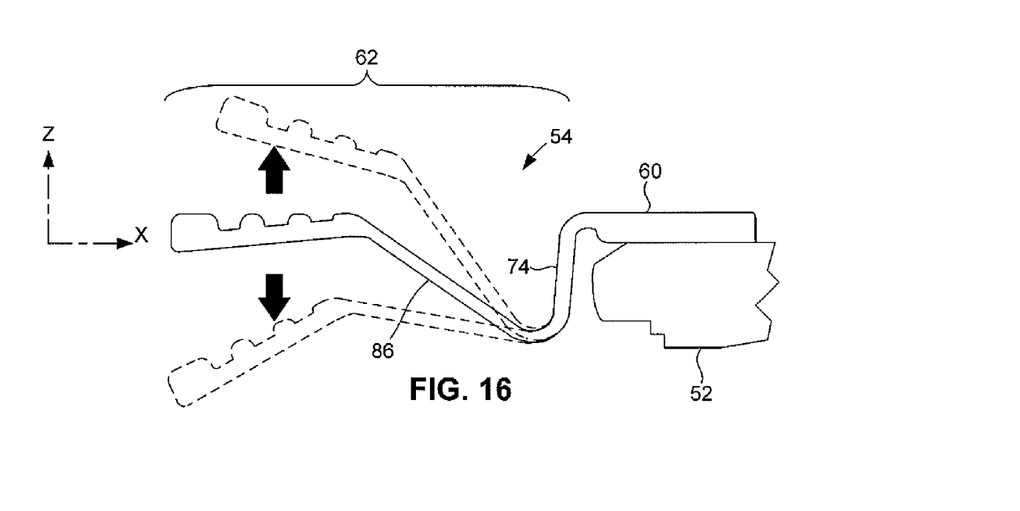
FIG. 16 is a side elevation view of the tab of the data communication module of FIG. 14, showing the flexure of the tab in a direction transverse to the module longitudinal axis in response to forces in directions transverse to the module longitudinal axis.

As illustrated in FIG. 16, in response to a force (indicated by the arrows) exerted upon second section 62 in an off-axis direction, such as the illustrated directions substantially transverse to the X axis, second section 62 flexes in a resilient manner Second section 62 flexes because the spring constant k1 is substantially less than the spring constant k2 for angle 80 (θ) in the above-referenced range of about 5 degrees to 30 degrees. Thus, in an instance in which, for example, a person's hand inadvertently brushes against second section 62 in an off-axis direction, second section 62 is not damaged but rather flexes harmlessly. Note that in embodiments in which a very small angle 80 (θ) is selected, this flexing action is greater than in embodiments in which a larger angle 80 (θ) is selected. However, a large enough angle 80 (θ) should be selected to provide a balance between this flexing action (i.e., flexing in response to an off-axis force to resist damage) and the push-pull tab function described below that is responsive to a pushing or pulling force in an X-axis direction.

It can also be noted that the above-referenced elongated and parallel members of second portions 74 and 86 define an open-frame structure that resiliently flexes (twists) in response to torsional forces in the Y-Z plane. Thus, portions of first and second sections 60 and 62 resiliently twist in response to such torsional forces. As first and second sections 62 are resilient (especially resiliently flexible hinge 78), they resiliently return to the unflexed position shown in solid line as soon as the force is removed. Thus, tab 54 also resists damage in the event it is subjected to torsional forces.

Figure 17:
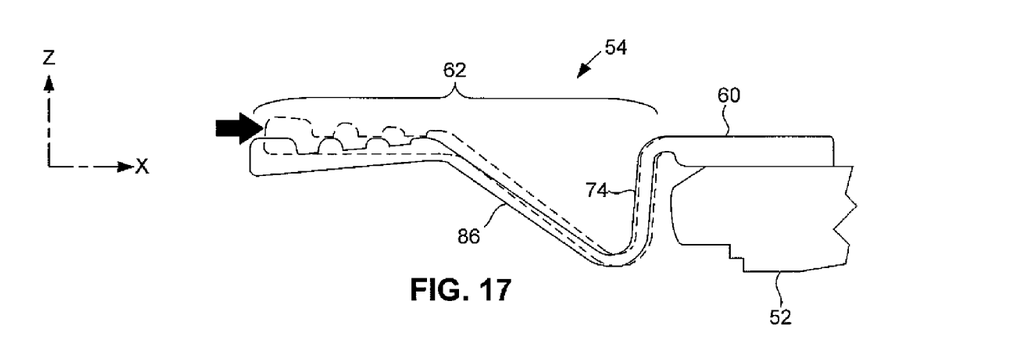
FIG. 17 is a side elevation view of the tab of the data communication module of FIG. 14, showing the compression of the tab in response to a "pushing" force in a direction of the module longitudinal axis.
Figure 18:
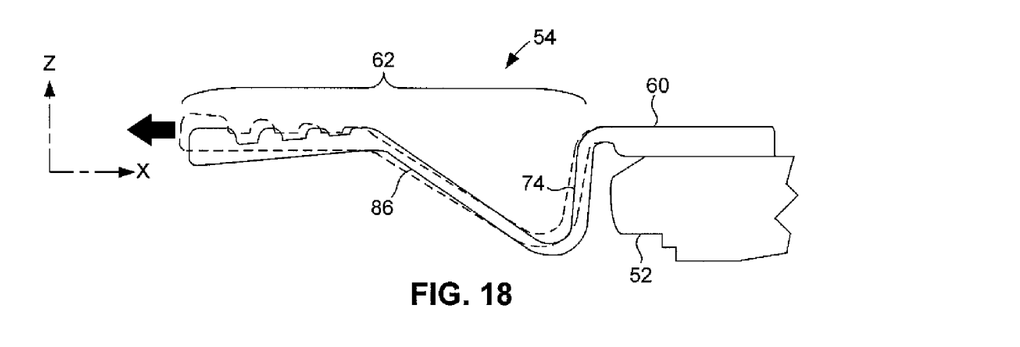
FIG. 18 is a side elevation view of the tab of the data communication module of FIG. 14, showing the compression of the tab in response to a "pulling" force in a direction of the module longitudinal axis.

In contrast with the flexibility indicated in FIG. 16, when a force is exerted upon second section 62 in an X-axis direction, as illustrated in FIG. 17 (a "pushing" force) and FIG. 18 (a "pulling" force), second section 62 advantageously responds in a more stiff and inflexible manner. Second section 62 resists flexure in the X-axis direction in response to a force in the X-axis direction because the spring constant k1 is much less than the spring constant k2 for an angle 80 (θ) in the above-referenced range of about 5 degrees to 30 degrees. Within this set of parameters, second portion 86 acts in a buckling mode rather than a bending mode. That is, second portion 86 behaves more like a rigid beam than a springy or flexible beam in response to a force in the X-axis direction. Accordingly, the relatively stiff second portion 86 transmits force in the X-axis direction, thus causing data communication module 50 to move or be displaced.

To insert data communication module 50 into a bay of a cage (not shown), a person first places the forward end of data communication module 50 in the opening of the cage. The person can then use tab 54 to push data communication module 50 further into the cage bay. More specifically, as illustrated in FIG. 17, a person can grasp a region of second section 62 of tab 54 and exert a "pushing" force, i.e., in a direction of the positive X axis. Initially, data communication module 50 resists moving, due to friction against the cage bay walls (not shown). Data communication module 50 thus momentarily continues to resist moving after the pushing force is initially applied, and tab 54 flexes slightly, as indicated in broken line. However, once the pushing force that is transmitted through tab 54 to housing 52 of data communication module 50 overcomes the force of friction, data communication module 50 begins to move (e.g., slide further into the cage bay). The resilience of portions of tab 54, such as its resiliently flexible hinge 78 (FIG. 15), causes tab 54 to return to the unflexed or rest position shown in solid line as soon as the force is removed.

Similarly, as illustrated in FIG. 18, a person can grasp a region of second section 62 of tab 54 and exert a "pulling" force, i.e., in a direction of the negative X axis. Initially, data communication module 50 resists moving, due to the force of friction holding it in place (e.g., in the cage bay). Data communication module 50 thus momentarily continues to resist moving after the pulling force is initially applied, and tab 54 flexes slightly, as indicated in broken line. However, once the pulling force that is transmitted through tab 54 to housing 52 of data communication module 50 overcomes the force of friction, data communication module 50 begins to move (e.g., slide further out of the cage bay). The resilience of portions of tab 54, such as its resiliently flexible hinge 78 (FIG. 15), causes tab 54 to return to the unflexed or rest position shown in solid line as soon as the force is removed.

In summary, tabs 14 and 54 of the above-described exemplary data communication modules 10 (FIGS. 1-13) and 50 (FIGS. 14-18), respectively, are sufficiently compliant (i.e., flexible, deflectable, etc.) in off-axis directions that they resist being damaged by forces in such off-axis directions, yet are sufficiently rigid in the direction of their longitudinal axes that a person can insert data communication modules 10 and 50 into a cage and withdraw them from a cage by pushing and pulling tabs 14 and 54, respectively.

One or more illustrative embodiments of the invention have been described above. However, it is to be understood that the invention is defined by the appended claims and is not limited to the specific embodiments described.

What is claimed is:

1. A data communication module, comprising:
   module electronics configured to process data communication signals;
   a module housing, the module housing having an elongated rectangular shape elongated in a direction of a longitudinal axis between a first end and a second end, the first end of the module housing having a module port for receiving a signal cable, the second end of the module housing having electrical contacts, the module electronics providing a processing path for the data communication signals between the module port and the electrical contacts; and
   an elongated tab having an end pivotally mounted to the first end of the module housing with a pin extending through a first bore in the module housing, the tab having a tab détente element engageable with a housing détente element of the module housing, the tab détente element being engageable with the housing détente element to hold the elongated tab in an orientation parallel to the longitudinal axis of the module housing and disengageable in response to an off-axis force to permit the elongated tab to pivot away from the orientation parallel to the longitudinal axis of the module housing, wherein the pin is configured to displace from the first bore in response to the elongated tab pivoting away from the orientation parallel to the longitudinal axis of the module housing.

2. The data communication module of claim 1, wherein the tab détente element comprises a cam follower in an end of the elongated tab, and the housing détente element comprises a cam extending from the module housing, and the cam extends into a recess in the cam follower when the elongated tab is in an orientation parallel to the longitudinal axis.

3. The data communication module of claim 2, wherein the recess in the cam follower comprises a trough having two walls at an oblique angle to the longitudinal axis, the cam comprises a ridge having a shape substantially complementary to a shape of the trough, and the ridge moves within the trough and cammably engages a first one of the two walls in response to an off-axis force in a first direction and cammably engages a second one of the two walls in response to an off-axis force in a second direction substantially opposite the first direction.

4. A data communication module, comprising:
   module electronics configured to process data communication signals;
   a module housing, the module housing having an elongated rectangular shape elongated in a direction of a first axis between a first end and a second end, the first end of the module housing having a module port for receiving a signal cable and a first bore through the first end, the second end of the module housing having electrical contacts, the module electronics providing a processing path for the data communication signals between the module port and the electrical contacts; and
   an elongated tab having an end pivotally mounted to the first end of the module housing by a pin extending through the end of the elongated tab and through the first bore in the first end of the module housing, the tab having a tab détente element engageable with a housing détente element of the module housing, the tab détente element being engageable with the housing détente element to hold the elongated tab in an orientation parallel to the longitudinal axis of the module housing and disengageable in response to an off-axis force to permit the elongated tab to pivot away from the orientation parallel to the longitudinal axis of the module housing, wherein the pin is configured to displace from the first bore in response to the elongated tab pivoting away from the orientation parallel to the longitudinal axis of the module housing.

5. The data communication module of claim 4, wherein the first section the tab détente element comprises a cam follower in an end of the elongated tab, and the housing détente element comprises a cam extending from the module housing, and the cam extends into a recess in the cam follower when the elongated tab is in an orientation parallel to the longitudinal axis.

6. The data communication module of claim 5, wherein the recess in the cam follower comprises a trough having two walls at an oblique angle to the longitudinal axis and the cam comprises a ridge having a shape substantially complementary to a shape of the trough.

7. The data communication module of claim 4, wherein the module housing has a Small Form Factor Pluggable (SFP) configuration.

8. A method for using a data communication module, the data communication module comprising module electronics configured to process data communication signals, a module housing having a first bore, and an elongated tab having an end pivotally mounted to the first end of the module housing by a pin extending through the end of the elongated tab and through the bore in the module housing, the module housing having an elongated rectangular shape elongated in a direction of a first axis between a first end and a second end, the first end of the module housing having a module port for receiving a signal cable, the second end of the module housing having electrical contacts, the module electronics providing a processing path for the data communication signals between the module port and the electrical contacts, the elongated tab the tab having a tab détente element engageable with a housing détente element of the module housing, the tab détente element being engageable with the housing détente element to hold the elongated tab in an orientation parallel to the first axis of the module housing and disengageable in response to an off-axis force to permit the elongated tab to pivot away from the orientation parallel to the first axis of the module housing, the method comprising:
   applying a force to the elongated tab in a direction corresponding to the first axis until the data communication module is displaced in response to the force and without pivoting the elongated tab; and
   applying a force to the elongated tab in a direction transverse to the first axis until the tab détente element disengages from the housing détente element, the elongated tab pivots out of an orientation parallel to the first axis, and the pin is displaced from the first bore.

9. The data communication module of claim 1, wherein the elongated tab is substantially rigid.

10. The data communication module of claim 1, wherein the pin extends through the end of the elongated tab.

11. The data communication module of claim 1, wherein the first bore is in a deformable semi-rigid plastic material deformable in response to displacement of the pin.

12. The data communication module of claim 11, wherein the first bore is coupled to a second bore by a first slot and coupled to a third bore by a second slot, and one of the first and second slots deforms in response to displacement of the pin.

13. The data communication module of claim 1, wherein the module housing has a Small Form Factor Pluggable (SFP) configuration.

14. The data communication module of claim 4, wherein the elongated tab is made of a single piece of molded plastic.

15. The data communication module of claim 4, wherein the elongated tab is substantially rigid.

16. The data communication module of claim 4, wherein the first bore is in a deformable semi-rigid plastic material deformable in response to displacement of the pin.

17. The data communication module of claim 16, wherein the first bore is coupled to a second bore by a first slot and coupled to a third bore by a second slot, and one of the first and second slots deforms in response to displacement of the pin.

18. The method of claim 8, wherein the first bore is in a deformable semi-rigid plastic material and wherein applying the force to the elongated tab in a direction transverse to the first axis further comprises:
   applying the force to the elongated tab in a direction transverse to the first axis until the first bore is deformed by the displacement of the pin.

19. The method of claim 18, wherein the first bore is coupled to a second bore in the module housing by a first slot and is coupled to a third bore in the module housing by a second slot and wherein applying the force to the elongated tab in a direction transverse to the first axis further comprises:
   applying the force to the elongated tab in a direction transverse to the first axis until one of the first and second slots is deformed by the displacement of the pin.

* * * * *